June 13, 1950
M. A. CLARK
2,511,100
HAYRAKE
Filed June 28, 1948
2 Sheets-Sheet 1
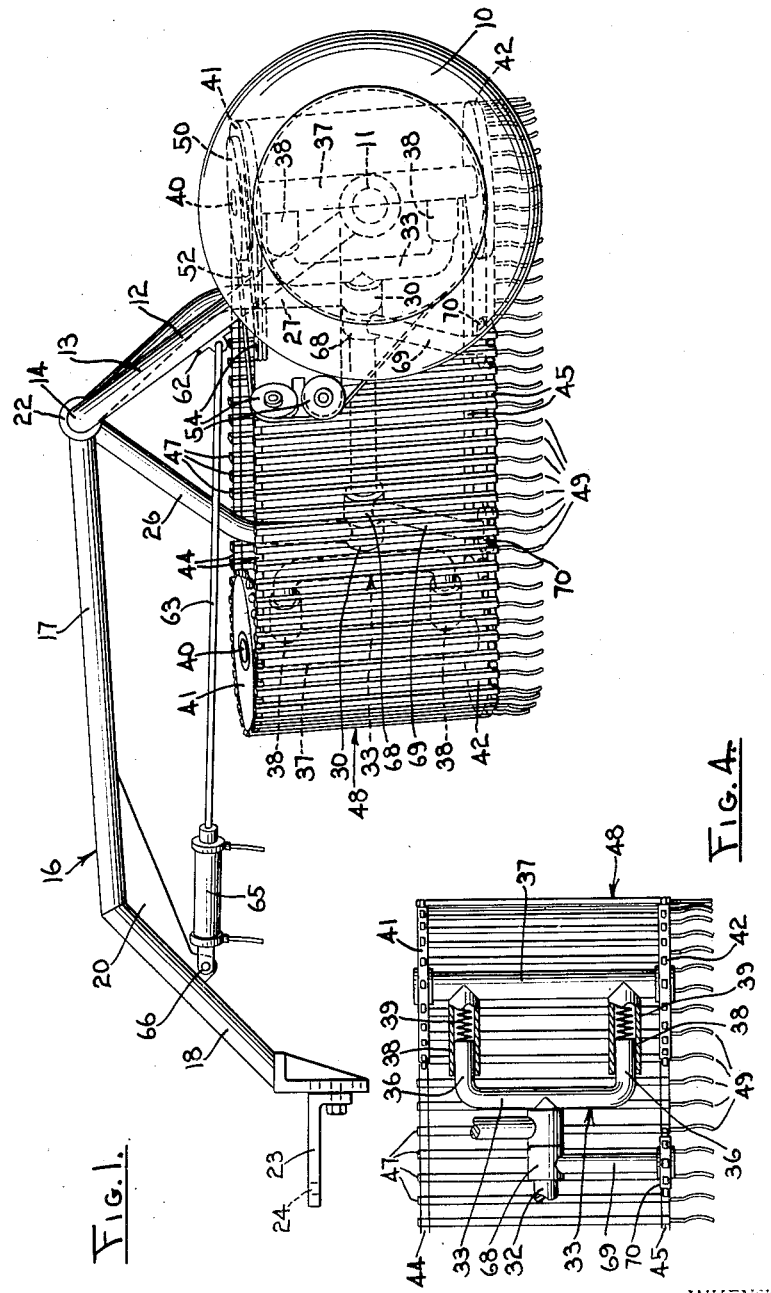
INVENTOR.
MARION A. CLARK
BY
Huebner, Maltby & Beehler
ATTORNEYS June 13, 1950 M. A. CLARK 2,511,100
HAYRAKE
Filed June 28, 1948 2 Sheets-Sheet 2
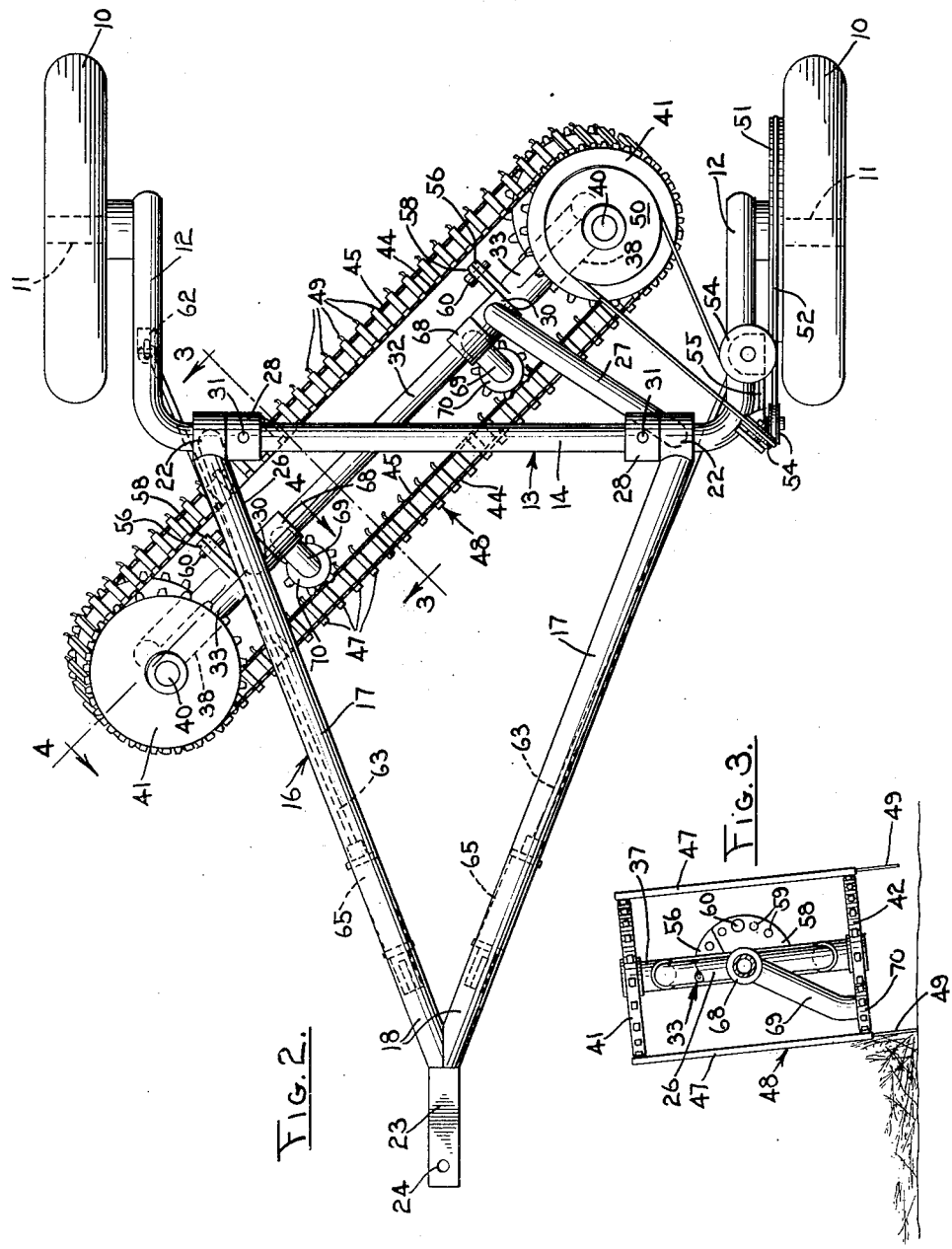
INVENTOR.
MARION A. CLARK
BY
Huebner, Maltby & Beehler
ATTORNEYS Patented June 13, 1950

2,511,100

UNITED STATES PATENT OFFICE 2,511,100

HAYRAKE

Marion A. Clark, Tulare, Calif.

Application June 28, 1948, Serial No. 35,712

8 Claims. (Cl. 56—376)

This invention relates to hay rakes and more particularly to side delivery hay rakes.

In the conventional side delivery hay rakes, as the hay is raked it is passed from one raking tooth to another and is rolled and tossed in the process thereby loosening the crowns and leaves from the hay and also breaking the stems thereof with the resultant loss of the loose crowns, leaves, and of the short broken stems. In the usual hay rake, encountered hay is moved along with the rake over the earth traversed for a considerable distance before it is delivered to one side of the rake. This also contributes to the loosening of the leaves and crowns and the breakage of the stems. This loss in the bulk of the hay due to the loosening of the crowns and leaves and the breakage of the stems is quite considerable and the deterioration of the quality of the hay due to such handling even more malefic.

In view of the stated disadvantages of the usual type of hay rake it is one object of the present invention to provide a side delivery hay rake in which the hay is raked and moved into a windrow at one side thereof with a minimum handling of the hay.

It is another object of the invention to provide a side delivery hay rake in which the hay is moved at substantially right angles to the direction of movement of the rake whereby the hay is moved the shortest possible distance to the windrow.

It is another object of the invention to provide means whereby the hay is not transferred from tooth to tooth during the raking thereof but is moved to the windrow by means of the teeth which initially engage the hay whereby the loosening of blossoms and crowns and the breakage of the hay stems is minimized.

Another object of the invention is to provide a hay rake that is adapted to rake heavy hay and light hay with equal efficiency.

Another object is to provide for a conveyor for a hay rake that is positively driven while the rake is being moved during the raking of hay.

A still further object of the invention is to provide a hay rake with which hay is raked with a minimum of tangling of the hay.

Other objects and advantages of the present invention will become apparent from the following description taken in connection with the accompanying drawings in which, Fig. 1 is a side elevational view of a side delivery hay rake made in accordance with the teachings of the present invention.

Fig. 2 is a top plan view thereof.

Fig. 3 is a vertical sectional view taken transversely through the conveyor mechanism taken along line 3—3 in Fig. 2, looking in the direction of the arrows.

Fig. 4 is a fragmentary vertical longitudinal sectional view through one end of the conveyor mechanism showing the mounting thereof, taken along line 4—4 in Fig. 2, looking in the direction of the arrows.

Referring in detail to the drawings:

The side delivery hay rake is provided with a pair of axially aligned wheels 10 rotatably supporting axles 11 attached to and extending outwardly from parallel spaced legs 12 of a U-shaped frame member 13. This U-shaped frame member 13 has a horizontally extending cross member 14, axially parallel with the wheels 10, to which is pivotally attached a horizontally V-shaped draft frame 16. This draft frame is provided with forwardly converging legs 17 and integral forwardly and downwardly converging portions 18 reinforced by gussets 20 secured as by welding in the lesser angles between the members 17 and their portions 18. The draft frame 16 is pivoted to the cross member 14 of the U-shaped frame member 13 by securing a sleeve 22 to the rear end of each of the horizontal legs 17, the sleeves 22 rotatably receiving the cross member 14. A drawbar 23 is adjustably attached to the underside of the forward, terminal, converging ends of the frame members 18 and is provided with a draft opening 24 vertically therethrough whereby the rake may be attached to a tractor or the like prime mover.

A collar 28 is located around the cross member 14 inwardly adjacent each sleeve 22. The collars 28 are securely located on the member 14 by a pin 31 passing through each sleeve and through the member 14 whereby the frames are relatively transversely located.

Means are provided for adjustably supporting a hay rake on this frame structure by providing a pair of downwardly extended tubular rake supporting members 26 and 27 each secured at its upper end to one of the sleeves 22. The lower end of each of the rake-supporting members 26 and 27 has a sleeve 30 secured thereto as by welding. These sleeves 30 are in alignment and located in spaced relationship and are adapted to rotatably receive a tubular member 32 therein angularly related to the normal direction of movement of the rake. A tubular U-shaped head 33 is attached as shown in Fig. 4 to each end of the tubular member 32 and extends outwardly in alignment therewith, each U-shaped head having spaced parallel outwardly extended legs 36. An axle housing 37 is adapted to be yieldably supported on each of the U-shaped members 33 by providing each axle housing with a pair of spaced parallel cylindrical open end tubes 38 secured thereto. These cylindrical tubes 38 are adapted to slideably receive the legs 36 of the U-shaped members 33 with a helical tension spring 39 located between the ends of each of the legs 36 and the respective bottoms of the cylindrical members 38. These axle housings 37 are held yieldably in spaced relationship in axial alignment on the cross member 14 of the U-shaped member 13. An axle 40 is rotatably received in each of the axle housings 37 in parallel approximately erect positions, and an upper sprocket 41 and lower sprocket 42 is attached to each end of each of the axles 40 for rotation therewith.

An endless chain 44 and 45 is located respectively around and between the upper sprockets 41 and the lower sprockets 42 respectively with a plurality of cleats or slats 47 secured to and extending between the chains 44 and 45 in equally spaced parallel relation. The sprockets 41 and 42 rotatably mounted on the conveyor frame 32, 36, and 37 with the endless chains 44 and 45 therearound and with the slats 47 attached therebetween form a complete conveyor mechanism 48. A plurality of teeth 49 are provided along the lower edge of the conveyor, each attached to one of the slats 47 and extended downwardly in alignment therewith.

The conveyor is also mounted horizontally angularly relative to the line of draft with one pair of sprockets 41 and 42 located laterally ahead of the other pair of sprockets 41 and 42 at the opposite end of the conveyor. With the conveyor set at this angle, as shown in Fig. 2, and with the conveyor driven at the proper speed, the hay raked or gathered by the teeth 49 is moved transversely over the ground relative to the direction of movement of the hay rake.

The conveyor is adapted to be mounted on the draft frame 16 in such a manner that the forward lower edge of the forward run of the conveyor is somewhat lower than the rear run of the conveyor, whereby the teeth 49 extending downwardly from the lower edge of the conveyor may either contact the ground or move closely adjacent thereto, raking the hay into a windrow at one side of the ray rake with the rear run of the conveyor and the teeth thereon moving oppositely at an appreciably cleared distance from the ground. This is accomplished by tipping the conveyor mechanism with the upper sprockets 41 ahead of the lower sprockets 42 accomplished by slightly rotating the conveyor supporting frame 32—33 in the sleeves 30 of the supporting members 26 and 27.

Means are provided for adjusting this angular tilt of the conveyor with the upper sprocket 21 slightly ahead of each sprocket 42 by providing an arcuate plate 56, as shown in Figs. 2 and 3, secured to each of the sleeves 30 and a similar arcuate plate 58 attached to each U-shaped member 33 closely adjacent the plate 56 with a plurality of equally spaced openings 59 through each of the plates whereby the angle between the supporting members 26 and 27 and the conveyor may be adjustably held by passing a pin 60 through aligned openings 59 in each of the plates 56 and 58.

Means are provided for driving the conveyor, with the forward run thereof moving from the forward sprockets 41 and 42 angularly toward the rear to the opposite side of the rake toward the other rear sprockets 41 and 42 while the rake is drawn forward or to the left as viewed in Figs. 1 and 2. This drive for the conveyor is designed to move the conveyor at a speed relative to the movement of the rake longitudinally over the ground whereby the teeth 49 move at right angles over the ground relative to the direction of movement of the rake.

The means for driving the conveyor during the hay-raking operation comprises a pulley 50 attached to the upper side of one of the sprockets 41. Another pulley 51 is secured to the inner side of the wheel 10. The pulley 50 and the sprockets 41 and 42 are driven from the pulley 51 on movement of the hay rake over the ground by means of an endless belt 52 passing over idler pulleys 54 rotatably supported on an idler pulley bracket 55 attached to one of the legs 12 of the U-shaped frame 13. These pulleys 50 and 51 are relatively of such size that the comparative peripheral speed of the wheels 10 and the movement of the teeth 49 causes the teeth to move over the ground at right angles to the direction of movement of the hay rake and a rearward velocity relative to the frame substantially equal to the earth traversing speed of the frame.

Means are provided for controllably adjusting the relative angularity between the U-shaped frame member 13 and the draft frame member 16 pivotally connected thereto, by providing a bracket 62 attached to the forward side of each of the parallel legs 12 of the U-shaped frame member 13 to each of which is pivotally connected one end of a link 63. The forward end of each link 63 is formed integral with the piston rod of a hydraulic ram 65, each of which is pivotally connected at 66 to one of the gusset plates 20. Thus by actuation of the hydraulic ram 65 the angularity between the frame members 13 and 16 is adjustably changed whereby the height of a conveyor supported thereon, and the teeth 49 thereon may be regulated relative to the ground.

While the conveyor is gathering hay, moving it into a windrow at one side thereof, the lower side of the forward run of the conveyor has a tendency to drag or to bow rearwardly between the lower sprockets 42. Means are provided for eliminating this bowing tendency of the lower side of the forward run of the conveyor by providing a pair of sleeves 68 fixedly attached around the tubular conveyor frame member 32. A downwardly and forwardly extending tubular supporting member 69 is secured to each sleeve with an idler sprocket 70 rotatably mounted at the lower end of each of these tubular members 69 axially parallel with the sprockets 41 and 42. The periphery of each of the sprockets is in substantial alignment with the forward periphery of each of the lower conveyor sprockets 42. The lower chain 45 meshes with each of these idler sprockets 70 whereby the lower portion of the forward run of the conveyor is prevented from bowing rearwardly.

*Operation*

Before the hay rake is placed in operation to gather mowed hay into windrows, it is adjusted to give the proper, approximately vertical attitude to the conveyor which regulates the relative height of the forward and rearward runs of the conveyor whereby the teeth 49 extending from the lower edge thereof either contact the ground or move closely adjacent thereto as they move angularly from the forward portion to the rearward portion of their orbit and whereby the teeth along the rearward run of the conveyor move an appreciable distance above from the ground. This angularity is obtained by removing the pins 60 from their respective openings 59 in both of the plates 56 and 58 and rotating the conveyor around its central horizontal tubular frame member 32 in the sleeves 30 to the desired angular position. The pins 60 are thereafter reinserted into aligned openings 59 through the adjacent plates 56 and 58 thereby holding the conveyor in this adjusted angular position.

Before the machine is place in operation to rake hay it is also adjusted to regulate the height of the conveyor relative to the ground over which the rake passes. This is accomplished by operation of the hydraulic rams 65 whereby the relative angle between the U-shaped supporting frame member 13 and the draft frame 16 pivotally connected thereto is either decreased or increased thereby raising or lowering the conveyor to the desired height relative to the ground.

The angularity of the conveyor relative to the normal direction of movement of the frame is fixed and need not be adjusted.

The hay rake is attached to a tractor or the like by passing a connecting bolt through the opening 24 in the drawbar 23. In raking hay, the hay rake is drawn forwardly over the ground with the teeth 49 at the forward run of the conveyor moving closely adjacent the ground. The conveyor is driven from one of the wheels 10 in response to rolling movement of the wheel over the ground by means of the pulleys 50 and 51 through the endless belt 52 at the proper speed whereby the teeth move in a transverse direction or at right angles to the direction of movement of the hay rake over the ground. Thus, as the hay rake is drawn forwardly, the hay is gathered by the teeth and moved transversely over the shortest possible distance into the windrow with a minimum of handling of the hay. The hay is also moved into the windrow with the same tooth or teeth that initially engaged therewith further minimizing the handling, shattering, and breaking of the hay.

Under the urging of the springs 39 of the U-shaped frame members 33 at each end and the axle housing 37, the forward and rear runs of the conveyor are maintained taut with a minimum of sagging. The lower edge of the forward run of the conveyor is additionally supported against rearward drag of encountered hay by means of the idler sprockets 70 fixedly located relative to this forward run of the conveyor and rotatable thereagainst.

From the foregoing description it will be seen that I have devised a hay rake in which there is a minimum of damage to and loss in the bulk of hay by the raking operation by movement of the hay over the shortest possible distance to the windrow thereby reducing the loosening of crowns and leaves of the hay and the breakage of the stems. The hay is moved to the windrow by the tooth or teeth of initial engagement.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. A side delivery hay rake comprising a pair of spaced axially aligned wheels, a supporting frame member borne by the wheels and extending upwardly and forwardly therefrom, a draft frame pivotally connected to the supporting frame on a substantially transverse horizontal axis for adjustable vertical pivotal movement relative to the supporting frame, a pair of horizontally spaced sprockets supported on the draft frame adjacent to the pivotal axis of the supporting frame member and the draft frame member, the sprockets having substantially vertical axes of rotation slightly forwardly inclined, one of said sprockets being located transversely rearwardly of the other sprocket, an endless upwardly extended hay conveyor traveled around and between the spaced sprockets and having forward and rearward runs, a plurality of spaced teeth extending downwardly from the lower edge of the conveyor, means for controlling the relative angle between the supporting frame and the draft frame members, and means for driving the conveyor with the forward run thereof moving rearwardly in the frame.

2. A side delivery rake comprising a draft frame, ground engaging direction control and frame support means mounted on the frame, a pair of elevationally spaced endless chains mounted for corresponding circuitous travel in the frame in elongated closed paths having forwardly and rearwardly disposed runs angularly related to the normal direction of movement of the frame in parallel planes horizontal longitudinally of the paths and forwardly tipped transversely thereof, a plurality of substantially parallel upright slats interconnecting the chains, raking teeth downwardly extended from the slats for hay engagement, and driving means motivating the chains, slats, and teeth in said circuitous travel rearwardly relative to the frame while traversing the forwardly disposed run.

3. A side delivery hay rake comprising a frame supported on ground engaging wheels defining a normal direction of earth traversing movement for the frame, an elongated endless hay conveyor supported on edge in the frame for travel in a substantially horizontal plane having a forward and a rearward run angularly disposed to the normal direction of movement of the frame with one end of the conveyor rearward of the other end, the forward run being lower than the rearward run, means having driven connection with one of the wheels and driving connection with the conveyor adapted upon forward movement of the frame to move the forward run of the conveyor rearwardly in the frame at a speed having a rearward component of movement relative to the frame substantially equal to the earth traversing speed of the frame, and a plurality of teeth mounted on the conveyor and downwardly extended from the lower edge thereof for hay engagement while transversing the forwarded run.

4. A side delivery rake comprising a forwardly moveable support frame having direction control means operably associated therewith, an endless hay conveyor mounted on edge in the frame for travel in an elongated circuitous path angularly disposed to the normal direction of movement of the frame for accumulation thereagainst of material to be raked, teeth rigidly mounted on the conveyor and downwardly extended therefrom, and ground driven means having driving connection with the conveyor adapted to drive said conveyor in its elongated circuitous path in response to earth traversing movement of the frame.

5. A side delivery rake comprising a forwardly moveable frame having direction control means operably associated therewith, a pair of horizontally spaced sprockets mounted for rotation about substantially vertical axes of rotation slightly forwardly inclined, one of said sprockets being located transversely rearwardly of the other sprocket, an endless hay conveyor mounted on edge for circuitous travel about the spaced sprockets and having forwardly and rearwardly disposed runs, a plurality of spaced teeth mounted on the conveyor and extended downwardly therefrom, and means for driving the conveyor with the forward run thereof moving rearwardly in the frame.

6. A side delivery hay rake comprising a forwardly moveable support frame, a rigid conveyor mounting member supported in the frame in a substantially horizontal position angularly disposed to the normal direction of movement of the frame, two pairs of vertically spaced axially aligned sprockets, a pair of said sprockets being mounted at each end of the mounting member for rotation about substantially parallel erect axes slightly forwardly inclined in the frame, a hay conveyor circuitously travelled on edge about the pairs of sprockets and having a forwardly disposed run and a rearwardly disposed run, resilient means interposed the sprockets and the mounting member whereby the sprockets are urged away from each other to maintain the conveyor in a taut condition, said conveyor having substantially erect spaced slats comprising a fence against which encountered hay and the like collects upon frame movement, raking teeth mounted on the conveyor and downwardly extended from the lower edge thereof for hay engagement, and ground driven means connected to the conveyor and adapted to move the forwardly disposed run rearwardly in the frame in response to forward earth traversing movement of the frame.

7. A side delivery rake having a forwardly moveable support frame, direction control wheels in supporting relation to said frame, an endless hay conveyor mounted on edge in the frame for travel in an elongated circuitous path angularly disposed to the normal direction of movement of the frame and having forwardly and rearwardly disposed runs, the conveyor being forwardly tilted transversely of its elongated path with the forward run thereof lower than the rearward run, a plurality of teeth attached to the conveyor and downwardly extended for hay engagement, and means having driven connection with a direction control wheel and driving connection with the conveyor circuitously travelling the conveyor in the frame in a direction and at a speed in response to forward earth traversing movement of the frame such that the teeth traversing the forward run move along the ground at right angles relative to the direction of movement of the frame.

8. A side delivery rake comprising an inverted U-shaped frame having a cross member and spaced legs, wheels rotatably mounted on the lower end of each leg in transverse axial alignment in direction controlling supporting relation to the frame, a draft frame pivotally attached to the cross member of the U-shaped frame for adjustable vertical pivotal movement, a conveyor supporting frame mounted on the draft frame adjacent to the pivotal connection thereof to the U-shaped frame and located in a substantially horizontal plane with one end thereof forwardly and laterally disposed in the frame relative to the other end, a pair of vertically spaced sprockets supported for unitary rotational movement at each end of the conveyor supporting frame, an endless chain extending around and between corresponding sprockets at each end of the conveyor supporting frame and having forwardly and rearwardly disposed runs, a plurality of erect spaced cleats attached to and extending between the spaced chains, a plurality of teeth individually attached to the cleats and downwardly extended therefrom, and means having driven connection with a support wheel and driving connection with a pair of the sprockets and motivating the sprockets at a speed in relation to earth traversing speed of the frame causing the teeth to travel rearwardly and laterally in the frame at a speed having a rearward component of movement relative to the frame while traversing the forward run substantially equal to the forward earth traversing movement of the frame whereby the teeth and cleats move over earth traversed at right angles to the direction of movement of the rake.

MARION A. CLARK.

REFERENCES CITED

The following references are of record in the file of this patent:

UNITED STATES PATENTS

| Number | Name | Date |
|---|---|---|
| 898,240 | Lunsford | Sept. 8, 1908 |
| 1,252,156 | Oberholtzer | Jan. 1, 1918 |
| 1,406,506 | Stansberry | Feb. 14, 1922 |